United States Patent [19]

Kramer

[11] Patent Number: 4,848,863
[45] Date of Patent: Jul. 18, 1989

[54] MULTI-WAVELENGTH SCANNING SYSTEM
[75] Inventor: Charles J. Kramer, Pittsford, N.Y.
[73] Assignee: Halotek Ltd., Rochester, N.Y.
[21] Appl. No.: 135,959
[22] Filed: Dec. 21, 1987
[51] Int. Cl.$^4$ .......................... G02B 5/32; G02B 26/10
[52] U.S. Cl. ..................................... 350/3.71; 350/168
[58] Field of Search ....................... 350/3.71, 6.2, 168, 350/320

[56] References Cited
U.S. PATENT DOCUMENTS

| | | | |
|---|---|---|---|
| 3,619,033 | 11/1971 | McMahon | 350/162.16 |
| 3,891,975 | 4/1975 | Deml | 365/216 |
| 4,106,884 | 8/1978 | Bryngdahl | 425/345 |
| 4,455,061 | 6/1984 | Case | 350/3.75 |
| 4,528,488 | 7/1985 | Doggett | 318/382 |
| 4,540,247 | 9/1985 | Nishi | 350/3.71 |
| 4,583,816 | 4/1986 | Kramer | 350/3.71 |
| 4,639,071 | 1/1987 | Matsumoto | 350/3.71 |

OTHER PUBLICATIONS

Kramer, C., *Proc. SPIE*, vol. 390, pp. 165-173, 1983.
Kramer, C., *Laser Focus*, Jun., 1981, pp. 70-82.
McMahon et al, *Appl. Opt.*, 8,2, 399 (1969).

Primary Examiner—Bruce Y. Arnold
Assistant Examiner—David J. Edmondson
Attorney, Agent, or Firm—Martin LuKacher

[57] ABSTRACT

A multi-wavelength (color—red(R)—blue(B)—green(G)) scanner system using diffraction grating deflector elements. A plurality of elements are used. Each has a different grating period. The elements all have the same lambda/D (wavelength to grating period) ratio. The elements are moved serially to intercept a composite, multi-wavelength beam. A preobjective lens is used to focus the successive, different wavelength beams to a single composite spot on an image surface. Since each element has the same lambda/D value, for a different wavelength, the spots from each wavelength will overlap and scan essentially colinear lines, successively, on the image surface. By moving the image surface an image area can be scanned. The composite spots and lines are used to read color images by measuring the spectrum of reflected light from the scanned image or may be used to generate color images by independently modulating individual sources of light comprising the beams and which make up the scanning spot.

25 Claims, 2 Drawing Sheets

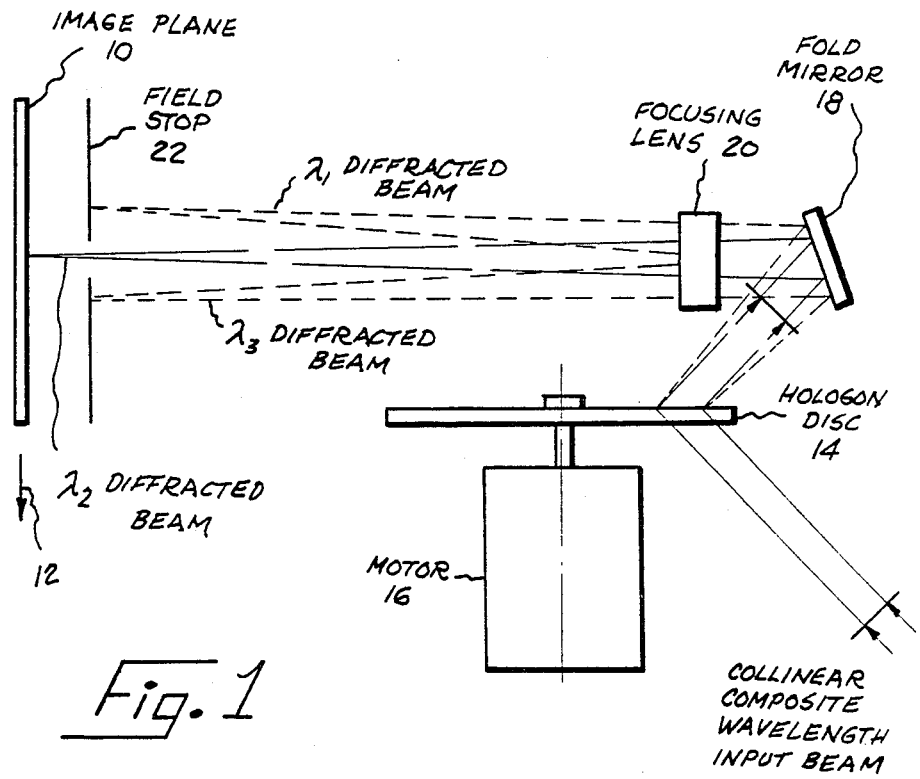
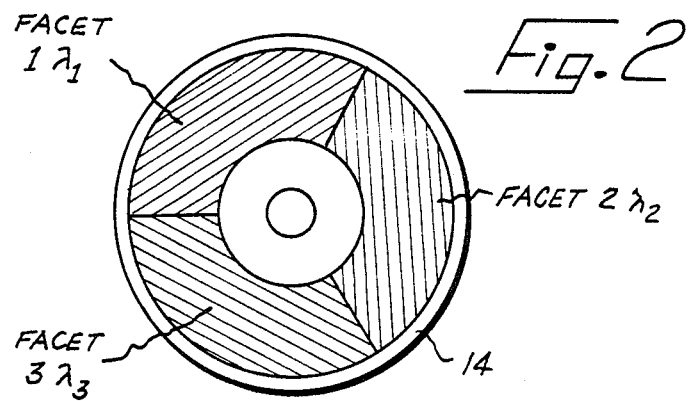

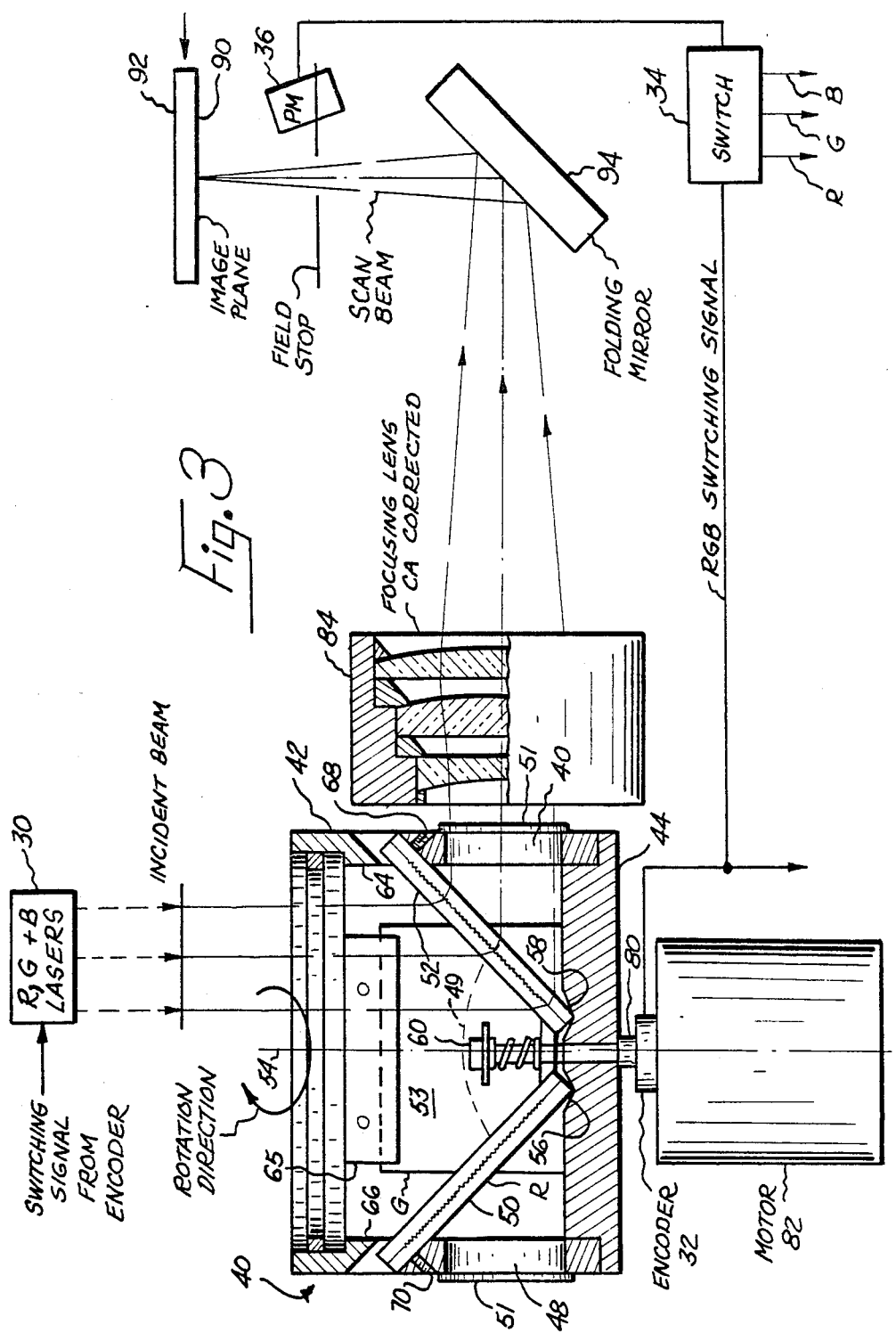

MULTI-WAVELENGTH SCANNING SYSTEM

DESCRIPTION

The present invention relates to multi-wavelength scanning systems, and particular to a scanning system for scanning colinear lines of different wavelength on an image surface.

The invention is especially useful in color image laser recorders or in reading color images by measuring of reflected light in the primary colors (R, G, and B) into which the color content of the image can be resolved.

It is desirable to use hologon deflectors (diffraction grating based deflector elements) for scanning light beams (such as laser beams) across an image surface. Such scanners which are available operate with monochromatic light. Where color images are scanned, a plurality of scanners are used. Further information with respect to hologon scanners may be found in the following articles authored by Charles J. Kramer: "Holographic Laser Scanners for Non-Impact Printing"), *Laser Focus,* June 1981, p. 70 and "High Speed Read/Write Techniques for Advanced Printing and Data Handling", *Proceedings of SPIE,* 390, 165 (1983). See also U.S. Pat. No. 4,583,816 issued to Charles J. Kramer on Apr. 22, 1986 and other Kramer patents referenced therein.

In order to scan a color image, the scanning lines of the different wavelengths must be essentially colinear so that the spots which define the color image or which scan an existing color image which is to be read, (and resolved into its fundamental color components and thereafter processed, as by being digitized into bytes representing the pixels thereof) are closely overlapping. Since hologon deflectors are dispersive elements, the different wavelengths leave the hologon at different angles and may scan at different velocities. Thus a single hologon deflector is not useful for multi-wavelength application. It has been proposed to use composite hologon deflectors with composite facets, each facet being sector-shaped and having sections of different radial width for deflecting different wavelengths simultaneously and in parallel. See D. H. McMahon, A. R. Franklin and J. B. Thaxter, "Light Beam Deflection Using Holographic Scanning Techniques", *Applied Optics,* 8, 2, 399 (1969), and U.S. Pat. No. 3,619,033 issued to McMahon on Nov. 9, 1971. This proposed multi-section hologon deflector is disadvantageous in being very difficult to fabricate. Also the composite facet and any focusing lens must have an aperture almost three times larger than that required for a monochrome scanner having the same resolution and format size. Also, in reading applications, three separate photo detectors with separate color band pass filters are required.

It is the principal object of the present invention to provide a multi-wavelength, diffraction grating scanning system suitable for scanning color images wherein the foregoing disadvantages are substantially obviated.

It is a further object of the present invention to provide a scanning system (method and apparatus) which utilizes a composite diffraction grating scanning element for scanning substantially colinear lines across an image surface (whether planar, cylindrical or of other curvature).

In accordance with the invention, there is provided a scanner system for scanning a plurality of essentially colinear lines each with light of a different wavelength on an image surface. The system makes use of a plurality of light deflector elements each corresponding to a different one of the wavelengths and each having a diffraction grating with essentially the same lambda/D ratio, where lambda is the wavelength to which the element corresponds and D is the grating period. An input beam having the different wavelengths is generated. This input beam may contain the different wavelengths each at a successive interval of time or may be a composite beam containing all of the wavelengths. The elements are moved, preferably by being rotated into position to intercept the beam, so that the beam is incident on the gratings at incidence angles which are the same and are diffracted at diffraction angles which are equal to the incidence angles for each of the wavelengths. The beam is then diffracted, preferably through a preobjective lens which focuses spots defining the scan lines on the image surface. Since the lambda/D ratios are the same and the grating elements successively (serially) intercept the beam, multi-wavelength scanning is achieved with hologons which are easy to fabricate because the sectors which define successive facets of a disc have the same grating period or planar transmissive diffraction elements which may be located in a holder all are separately fabricated with the same grating period throughout. Reference may be had to U.S. patent application Ser. No. 941,880 filed by Charles J. Kramer on Dec. 15, 1986, for further information respecting such deflectors which use one or more planar, transmissive hologon deflector elements. Such facets or elements containing only a single periodicity corresponding to the lambda/D ratio required to scan different ones of the desired wavelengths make up a composite deflector which may readily be fabricated. If the input beam to the hologon deflector is composed of three colinear (preferably collimated) beams of different wavelength, the deflector will act as both a beam deflector and variable wavelength filter. When the hologon is rotated, each element will intercept the incident beam, causing one of the wavelengths to be scanned across the image surface and the other of the wavelengths to be diffracted outside the image path (where they can be intercepted by field stops and blocked).

In reading color images, only one photodetector is required, since each color is serially scanned across the image surface. In writing or printing applications, each color beam forming the composite colinear input beam may be individually modulated only when the element corresponding thereto intercepts the beam. The other beams can be disabled or allowed to continue to propagate if a field stop is used to block them. The aperture of the optics is necessarily only as large as required for a monochrome application at the longest wavelength. A preobjective lens used to focus the beam need only have such aperture.

The foregoing and other objects, features and advantages of the invention as well as a presently preferred embodiment thereof will become more apparent from a reading of the following description in connection with the accompanying drawings in which:

FIG. 1 is a schematic view, in elevation, illustrating a scanning system in accordance with an embodiment of the invention;

FIG. 2 is a top view of the hologon scanner disc shown in FIG. 1; and

FIG. 3 is a schematic view, in elevation, of a multi-wavelength (color) scanning system in accordance with another embodiment of the invention.

Referring to FIGS. 1 and 2, there is shown a scanner system having a medium which presents an image surface 10 in an image plane. The scan lines extend horizontally and perpendicular to the plane of the paper on which the figure is drawn. The surface 10 may be a photosensitive surface, such as a film, or photosensitive paper for the purpose of making color prints. The medium is moved in the direction of the arrow 12 so that successive scan lines of different wavelengths, indicated as lambda$_1$, lambda$_2$, and lambda$_3$, are scanned. Lambda$_1$, lambda$_2$ and lambda$_3$ may be primary RGB colors, respectively.

The deflector of the system is a hologon disc 14 having three sectors or facets (facet 1, 2 and 3). Each facet contains a holographic grating which may be fabricated in accordance with the techniques described in the above-identified Kramer articles and patents. The hologon disc is rotated by a motor 16 and intercepts a collimated beam which is composite in that it contains all three wavelengths, lambda$_1$, lambda$_2$ and lambda$_3$. Each facet intercepts the beam successively. The beam is collimated and has an angle of incidence $\theta_i$ equal to the angle of diffraction $\theta_i$. In this case, the angle of incidence and the angle of diffraction are equal. Preferably these angles are 45°. The lambda/D ratio of each facet is essentially the same and for the 45° case is 1.41421. All facets satisfy the grating equation.

$$\text{Sin } \theta_i + \text{Sin } \theta_d = \text{lambda}/D$$

where lambda is the electromagnetic wavelength of the light and D is the grating period.

Since each facet has a different grating period, the wavelength corresponding to that section will be diffracted at a diffraction angle of 45°, then reflected by a fold mirror 18, and focused by a preobjective focusing lens 20 on a spot on the image surface 10.

Only the wavelength lambda$_2$ is focused at this spot. The other wavelengths have different diffraction angles and are intercepted by a field stop 22. It is only when the diffraction angle for each beam is the same that the spots will remain overlapped when scanned across the image plane to form colinear scan lines. In other words the hologon disc 14 acts as both a beam deflector and variable wavelength filter. Only one wavelength at a time is scanned across the scan line on the image surface 10. The other two wavelengths are diffracted out of the desired path, where they are intercepted by the field stop 22.

Each facet and the preobjective scan (focusing) lens 20 need only have an aperture as large as required for handling a single wavelength at the longest wavelength used (lambda$_3$).

If the medium and image surface 10 are moved stepwise, the scan lines will be colinear with each other. If the medium moves continuously, since the lambda over D values for all facets are equal, the serially scanned beams will be spatially displaced in the direction of the motion of the image surface by the ratio of the speed of the surface to the scanning speed. The speed of motion and the scanning speed (the rate of rotation of the motor 16) can be adjusted so that the sequentially scanned beams overlap with the distance between their peak intensity points approximately one-half the distance between the 1/e$^2$ intensity points of the Gaussian profile of the scan beam. e is the base of Napierian logarithms.

If the imaging application requires that each wavelength image spot overlap exactly with the other wavelength image spots for each scan line (the composite of three colinear scan lines), this can be achieved by making fine adjustments to the lambda over D ratio of each facet. For example, considering the case where the following wavelengths are to be scanned: lambda$_1$ equals 0.638 μm, lambda$_2$ equals 0.5435 μm and lambda$_3$ equals 0.488 μm. um means "micrometer". These beams will overlap for a preobjective scanner having the incident and diffracted angles equal to 45° and a focusing lens of focal length of 500 mm if the facets corresponding to lambda$_1$, lambda$_2$ and lambda$_3$ have the following lambda/D ratios: 1.414237, 1.4142136 and 1.4141900; and the image surface moves a total distance of 25 μm during the three serial wavelength scans.

Referring to FIG. 3 there is shown a hologon scanner of the type described in the above-identified application for U.S. Patent filed by Charles J. Kramer on Dec. 15, 1986. In this system an incident beam of collimated light is derived from three lasers indicated as RGB lasers 30. These lasers are successively enabled by a switching signal from an encoder 32 disposed around the shaft 80 of a motor 82 which rotates a hologon deflector assembly 40 about an axis 54.

This assembly is provided by a holder made up of a cylindrical side wall 42 and a base 44. The periphery of the base 44 is stepped. The sidewall 44 is assembled with the base 44 in the step. The sidewall has exit window 46, 48 and 49 which are 120° apart along the axes through the center of these windows which axes are perpendicular to the axis of rotation 54. The windows may be covered with glass discs 51. These windows are opposed to three planar transmissive diffraction grating units 50, 52 and 53, respectively for diffracting the R, B and G wavelengths. These gratings are separate facets which serially intercept the incident beam of collimated light from the laser source.

These gratings 50, 52 and 53 are separate facets, similar to the facets of the hologon disc 14 (FIG. 1), of essentially the same lambda/D ratio. The grating diffraction surfaces are inclined at like angles to the axis of rotation. This angle is preferably 45° and the angle of incidence and angle of diffraction are equal. The diffracted beam or scanned beam propagates along the beam path perpendicular to the rotation axis 54. The diffraction surfaces of the gratings can be formed in one substrate which is protected by a plate. Each grating can be fabricated individually with its own individual periodicity and then placed in the holder.

The lower edges of the gratings are mounted in notches, two of which 56 and 58 for the gratings 50 and 52 are shown in FIG. 3. The lower ends of these gratings is held down by a spring clamping mechanism 60 including a conical washer which bears against the top surface of the grating units at the lower end thereof. The upper ends of the gratings are sandwiched between springs 64, 65 and 66. Using adjusting screws, two of which 68 and 70 are shown in FIG. 3, and by extending or retracting the screws, the tilt angles of the gratings can be adjusted with respect to the axis of rotation, and the collimated incident laser beams which are parallel to the axis of rotation 54. This adjustment adjusts the predetermined angle of the grating surfaces with respect to the axis 54 and the incident beam so as to obtain the 90° deflection between the incident and diffracted beams for the wavelength which the periodicity of the grating matches. The grating tilt adjustment can be used to compensate for facet to facet (grating to grating) cross-scan error caused by small differences in the facet periodicity (D values). The tilt adjustment can also be used to compensate for substraight wedge and/or fixed angular displacements of the axis 54 of the assembly 40 with respect to the axis of the shaft 80 of the motor 82. The mounting or baseplate for the motor is not shown to simplify the illustration.

A preobjective focusing lens 84 is used to focus the dots constituting the colinear scan beams to the surface 90 of a moveable medium 92 which is located at an image plane of the lens 84. The propagation path of the diffracted beam extends backward in the same direction as the incident beam upon reflection by a folding mirror 94. Folding or fold mirrors may be used in order to compress the size of the system. While flat image surfaces are shown, the image surfaces may be circular and located on the inside of a drum having an axis coincident with the axis 54 of rotation of the assembly 40. It will be noted that one of the gratings 50, 52 and 53 comes into play at a time as the assembly rotates. The system illustrated in FIG. 3 generates an essentially bow-free scan line having a cross-scan angular position which is essentially insensitive with respect to deflector wobble and centration errors, because of the geometry of the system. A significant of the scanner system illustrated in FIG. 3 is that the beam scan angle $\theta_S$ is equal to the rotation angle $\theta_R$.

A field stop may be used to remove the other wavelengths than that which matches the grating which comes into play (which intercepts the incident beam). However such a field stop is unnecessary when the lasers are successively enabled when the grating corresponding thereto comes into play. Then only one wavelength is active in the system at a time.

The switching of the laser sources also has advantages in reading applications when output signals corresponding to each of the wavelength components (the primary colors) of the color image on the surface 90 being scanned are desired. To this end the switching signal from the encoder 32 is applied to a switch module 34 which switches the output of a photo-detector, such as a photo multiplier 36 to three separate channels indicated as R, G and B. The signals from these channels can then be digitized or otherwise processed. Synchronizing signals can be obtained from the mechanism which moves the image surface in the direction shown by the arrow, for example, and from the rotation of the shaft 80. It will be appreciated that the photo-detector 36 is able to observe the entire image plane surface 90. Only a single photo-detector is needed, thereby avoiding the need for separate photo-detectors with their own filters to make them responsive only to the wavelengths of interest (the R, G and B wavelengths, respectively, one for each of the photo-detectors).

Accordingly, it will be apparent that there has been provided an improved multi-wavelength scanning system utilizing holographic (hologon) sensors and which is applicable for multi-wavelength writing as well as reading applications. Variations and modifications in the herein described system, within the scope of the invention, will undoubtedly suggest themselves to those skilled in the art. Accordingly, the foregoing description should be taken as illustrative and not in a limiting sense.

I claim:

1. The method of scanning an optical beam having a plurality of different wavelengths to form scan lines on an image surface which comprises the steps of propagating said beam toward a deflection station; and successively moving a plurality of diffraction grating deflection elements, each having essentially the same lambda/D ratio for different ones of said plurality of wavelengths, where D is the period of said grating elements and lambda is the electromagnetic wavelength, through said station so that said beam is successively intercepted by and incident thereon and scanning beams are diffracted therefrom upon said image surface to form said scan lines for each of said wavelengths which are essentially colinear with each other.

2. The method according to claim 1 wherein said moving step is carried out by rotating said elements.

3. The method according to claim 2 wherein said rotation step is carried out by rotating the elements about the same axis.

4. The method according to claim 3 wherein said grating elements are arranged as successive facets on a disc having said axis as its axis of rotation.

5. The method according to claim 3 wherein said grating elements are planar light transmissive members having said gratings formed therein.

6. The method according to claim 5 wherein said gratings are arranged in a holder which is rotated about said axis at the same angle of incidence $\theta_d$ to said beam and said diffracted beams leave said holder at an angle of diffraction $\theta_i$, where $\theta_i$ is essentially perpendicular to the axis of rotation.

7. The method according to claim 1 wherein said propagating step propagates said beams as collimated light.

8. The method according to claim 1 wherein said light of different wavelengths is combined to form said beam as a composite plural wavelength beam.

9. The method according to claim 8 further comprising the step of blocking the propagation of light diffracted by said element other than that of the scanning beam which forms said scan lines.

10. The method according to claim 1 wherein light of said different wavelengths is propagated successively to provide said beam.

11. The method according to claim 1 further comprising the step of focusing said diffracted scanning beam on said image surface to form said essentially colinear scan lines.

12. The method according to claim 1 wherein said beam is generated with a plurality of sources of light, each of a different one of said wavelengths each of which beams is diffracted at a different angle to form a different one of said essentially colinear scan lines, detecting when each of said elements are located in said station, enabling only the generation of the beam from one of said plurality of sources of light of different wavelength when the element which diffracts the beam of the wavelength to form one of said essentially colinear scan lines is detected.

13. The method according to claim 12 further comprising the step of detecting light reflected from an image on said surface while said diffracted beam is scanning said lines on said surface, and segregating the detected light into different ones of said wavelengths, each when a different one of said elements is being detected.

14. An optical scanner system for scanning a plurality of essentially colinear lines, each with light of a different wavelength on an image surface, which system comprises a plurality of light deflector elements each corresponding to a different one of said wavelengths and each having a diffraction grating with essentially the same lambda/D ratio, where lambda is the electromagnetic wavelength to which the element corresponds and D is the grating period, means for providing an input beam having said different wavelengths, means for moving said elements successively into position to intercept said input beam so that said beam is incident on said grating at an incidence angle $\theta_d$ and is diffracted at a diffraction angle $\theta_i$ which when the element which intercepts said beam and said wavelength of said beam correspond to each other, said beam is diffracted to form a scan beam which scans one of said colinear lines on said image surface.

15. The system according to claim 14 wherein $\theta_i = \theta_d$ for each of said wavelengths when the element corresponding thereto intercepts said beam.

16. The system according to claim 15 wherein the sum of $\theta_i$ and $\theta_d$ is essentially equal to 90°.

17. The system according to claim 14 wherein said members are mounted in successively angularly displaced relationship, and said members are rotatable about the same axis.

18. The system according to claim 17 wherein said elements are planar light transmissive members having the diffraction gratings formed therein and mounted adjacent to each other to form sectors of a disc which is rotated about said axis.

19. The system according to claim 17 wherein said elements are planar light transmissive members having the diffraction grating formed therein, a holder rotatable about said axis, said members being mounted tilted in the same direction toward said axis to define a pyramidal array.

20. The system according to claim 19 wherein said beam is parallel to said axis and said diffracted beam is transverse to said axis to provide a scan beam at or within a few degrees of perpendicularity to said axis.

21. The system according to claim 17 wherein said beam is a beam of collimated light.

22. The system according to claim 14 further comprising a field stop extending across the path of said scanning beam for blocking light of wavelength other than that corresponding to the wavelength of the element diffracting said beam from reaching the image surface.

23. The system according to claim 14 further comprising a focusing lens between said element and said image surface for focusing said scan beam to a spot defining said lines as said beam scans across said surface.

24. The system according to claim 23 further comprising means for reading an image illuminated by said scan lines comprising a single photodetecting means, and means responsive to the location of said elements in intercepting relationship with said beam for selecting outputs corresponding to the different wavelength of light constituting selected wavelengths of said scanned image.

25. The system according to claim 14 wherein said beam is generated by a plurality of sources of light each of a different one of said wavelengths, and means responsive to the location of said elements in intercepting relationship with said beam for enabling the one of said plurality of sources providing the wavelength to which said intercepting element corresponds.

* * * * *